Oct. 12, 1965     M. SAMBERG     3,210,908
APPARATUS FOR FORMING FLEXIBLE PACKAGES
Filed April 24, 1962     8 Sheets-Sheet 1

INVENTOR.
MICHAEL SAMBERG
BY
Harry G. Shapiro

Oct. 12, 1965 M. SAMBERG 3,210,908
APPARATUS FOR FORMING FLEXIBLE PACKAGES
Filed April 24, 1962 8 Sheets-Sheet 5

INVENTOR.
MICHAEL SAMBERG
BY
Harry S. Shapiro

INVENTOR.
MICHAEL SAMBERG

United States Patent Office 3,210,908
Patented Oct. 12, 1965

3,210,908
APPARATUS FOR FORMING FLEXIBLE PACKAGES
Michael Samberg, Livingston, N.J., assignor to Key Packaging & Engineering Co., Fort Washington, Pa., a corporation of Pennsylvania
Filed Apr. 24, 1962, Ser. No. 189,836
11 Claims. (Cl. 53—182)

The invention relates to flexible packaging, and is more particularly directed to an improved machine for forming a plurality of flexible, pouch-like packages for each cycle of the machine's operation.

It is recognized that a machine which will produce flexible packages containing a liquid, and which does not leak, also is capable of packaging any other product or commodity, such as creams, pastes, powders, granules and larger discrete articles; the ability of a package to hold a liquid demonstrates extremely reliable seals. The machine of the invention is capable of packaging liquids at high rates of productivity and with extremely reliable seals.

A primary object of the invention is to provide a machine capable of converting webs of heat-sealable material or film into a plurality of packages for each cycle of the machine, to fill and seal the packages, and where desired, to cut or perforate the webs or films at their sealed areas to furnish unit packages of the packaged commodity.

Another object of the invention is to provide a machine for forming a plurality of flexible packages during each cycle of the machine in which individual or unit packages may be provided by cutting or perforating within the sealed areas simultaneously or contemporaneously with the formation of the sealed areas, thereby eliminating a separate cutting or perforating operation with the attendant problems of suitably timing and matching the operation of a cutting or perforating tool with the sealed areas at a subsequent station.

A further object of the innvention is to provide a packaging machine of the type under consideration in which the length, width and the number of packages produced in each cycle may be varied with very simple adjustments of the machine, and since the slitting or perforating operation to provide a unit package is accomplished contemporaneously within the formation of the seals, the formation of unit packages of desired size also is accomplished in a very simple and expeditious manner.

Still a further object of the invention is to provide a machine of the type under consideration wherein the cross or end sealing means, the actuation of which determines the length of the packages, is arranged to also travel linearly to advance or feed the sealable webs a predetermined distance, thereby affording means acting to both seal and feed, and further, since cutting and/or perforating is accomplished contemporaneously with sealing, the formation of unit packages of uniform size having the same quantitative contents in reliably sealed packages is facilitated.

Another object of the invention is to provide a mounting arrangement for the so-called side sealing jaws (the jaws which seal the webs to one another at the areas constituting the sides of the formed unit packages) wherein the jaws are readily adjustable to desired position and wherein the jaws of a pair will coact with one another to engage the heat-sealable webs with proper and uniform pressure, though the operating faces of the jaws are not precisely machined.

Still another object of the invention is to provide a mounting arrangement for an end sealing jaw (the jaw which acts to seal the web transversely of the areas sealed by the side sealing jaws) and an associated cutting and/or perforating means wherein by simple selection as desired, end sealing alone, end sealing and cutting, end sealing and perforating, or end sealing and cutting and perforating may be obtained.

These, and other objects and advantages of the invention will be aparent from the following detailed description, taken in conjunction with the drawings which illustrate a preferred embodiment of the invention, in which.

Figure 1:
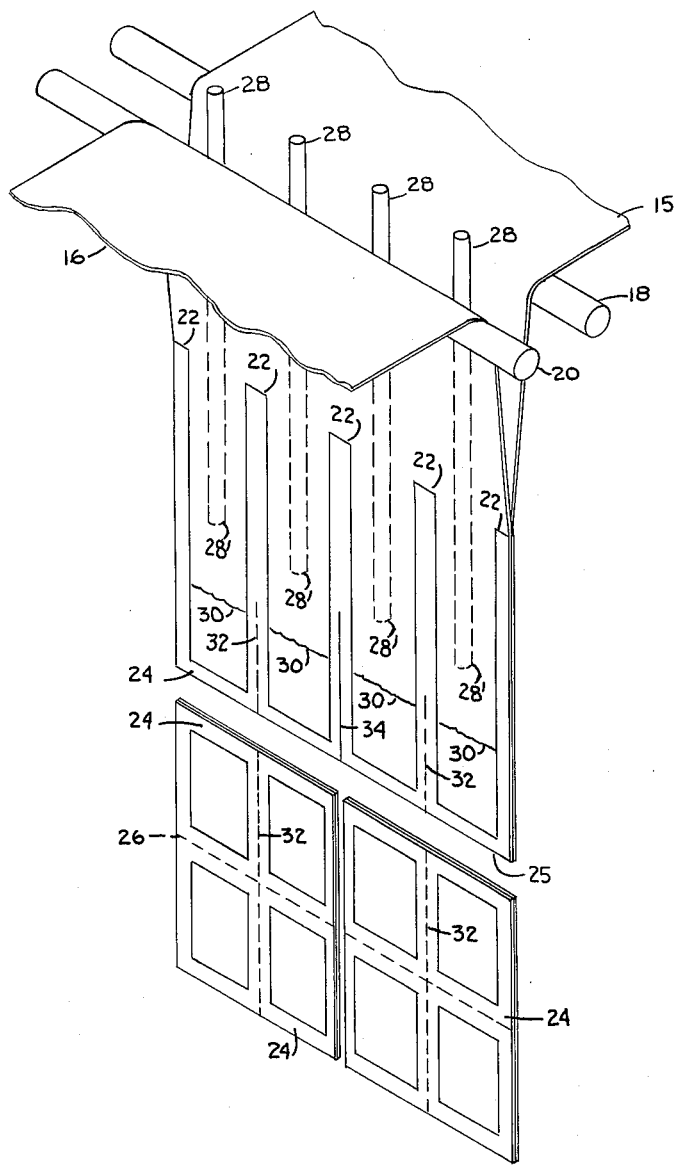
FIG. 1 is a schematic view showing the manner in which a plurality or group of unit packages are formed by the machine of the invention.

The main functions and operations of the machine of the invention generally may be explained with reference to FIG. 1. A pair of heat-sealable webs 15 and 16 are led over guide rolls 18 and 20 to bring the surfaces of the webs into juxtaposition. The webs are of any suitable heat-sealable film, or sheet material having a heat-sealable coating, examples of which are films of polyethylene, mylar, or cellophane, suitably coated aluminum foil, etc. The adjacent webs are sealed to one another at laterally spaced areas 22, which for convenience and to distinguish them from the seals which extend transversely thereto, will be referred to as the side seals for the finished unit packages. The number of side seals 22 will depend upon the size of the machine, and the number of packages desired for each cycle of the machine. As shown, the webs are sealed to one another at five (5) laterally spaced areas to furnish four (4) unit packages for each cycle of the machine.

A transversely extending cross or end seal 24 is imparted to the webs to extend across their entire widths. The end seal 24 is made of a width so that a line of severance 25 or a line of perforations 26 within such sealed area furnishes a sealed area of sufficient width for the leading end of one package and the trailing end of an adjoining package. As will subsequently be described, the sealing jaws which clamp the webs to form the end seals 24 may include within them cut-off or perforating means to completely separate or separably connect the unit packages. Also, as will subsequently be described, the end sealing means and associated cutting or perforating means are mounted for movement bodily, thereby also serving, when the end sealing means is in closed condition, to feed the webs a predetermined distance for each cycle of the macihne's operation. When the end sealing means is in closed condition, the sealing means for the side seals 22 are open to permit the webs to be pulled forward for the length of the package desired. As subsequently will be explained, the desired extent of feeding to furnish a predetermined unit package length is readily adjustable, as desired.

As the heat-sealable webs 15 and 16 are fed forward, after the formation of the side seals 22, and with the end sealing means or jaws clamped across the webs to provide an end seal 24, liquid is pumped out of tubes 28 at a rate such that the fluid level 30 is always equidistant from the end 28′ of each filling tube. The pumping is synchronized with the feeding movement of the webs to prevent splashing and contamination of the areas to be sealed.

In the showing of FIG. 1, and for that portion thereof above the line of severance 25, the webs 15 and 16 have just been fed to the bottom of the machine's stroke, and the formed pouches are open at their top ends and have been filled with liquid. The end sealing jaws have opened and will commence their return to seal the open ends of the filled packages and provide a bottom end seal for the next row of pouches to be filled. The sealing jaws for the laterally spaced side seals 22 have closed to slightly overlap the previously sealed segments of the webs at the side seal areas.

When solids, powders, or hard objects are to be packaged, the tubes 28 may be replaced by other appropriate feeding devices. Means are provided for slitting or perforating within the sealed areas 22, except at the extreme edges of the webs, such operation occurring automatically as the webs are fed or advanced. FIG. 1 shows two lines of perforations at 32 and one through-cut 34. It will be understood, of course, that any combination may be provided so that all of the packages may be separably connected to one another by perforations formed in the webs, or the webs may be completely cut to furnish separated unit packages entirely, or a combination of a plurality of separably connected packages may be obtained, as shown.

Figure 2:
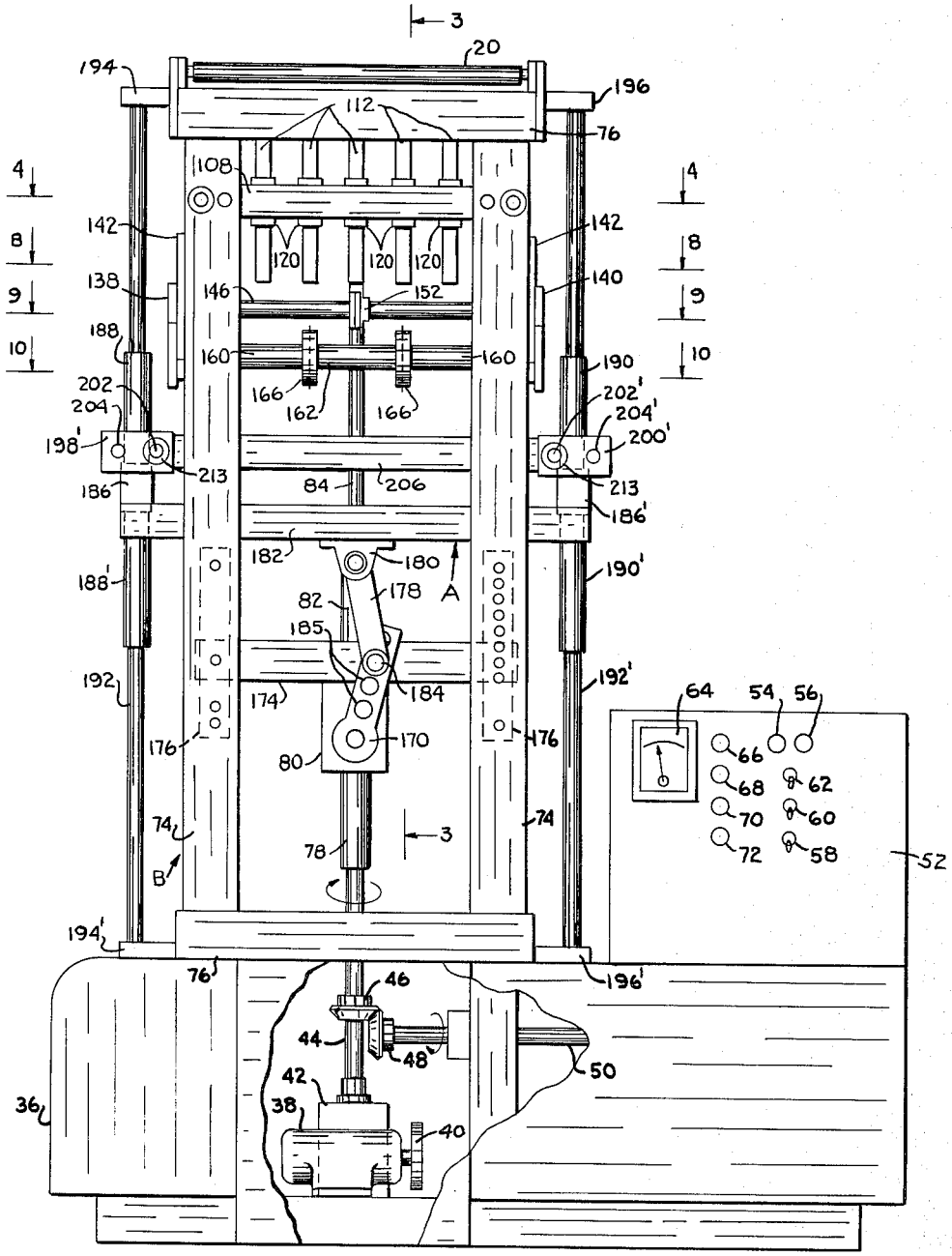
FIG. 2 is a front elevational view of a machine in accordance with the invention.

In greater detail, and referring to FIG. 2, the packaging machine of the invention comprises a base 36 within which is supported a motor 38 which, through suitable pulleys and a belt 40, drives a gear reducer contained in box 42. The output of the reducer is in a vertical direction, a shaft 44 extending upwardly to drive a reciprocable frame A which supports the combined mechanism for feeding the webs and providing the end seals and associated cutting and/or perforating means. A pair of mitre gears 46 and 48 transfer the rotation of the vertically disposed shaft 44 to a horizontally extending shaft 50. The shaft 50 provides power to liquid pumps, or other feeding means and carries cams to energize micro-switches to operate solenoid valves for pneumatic cylinders which actuate the end sealing means, as will subsequently be described. The package contents feeding mechanism does not form a part of the present invention, and is not shown.

A control box 52 is mounted upon the base 36 to permit control of the motor 38 by push-buttons 54 and 56. The control box includes a toggle switch 58 for the heaters associated with the end sealing means, a toggle switch 60 for the heaters of the side sealing means, and a third switch 62 to energize the solenoid valve circuit for the liquid pumping means or other feeding device. Also, a combination heat-sensing and control instrument 64, controlled by the knobs 66 and 68 is provided to permit adjustment of temperature of the side sealing means. The knobs 70 and 72 are provided to permit adjustment of temperature of the end sealing means.

Figure 3:
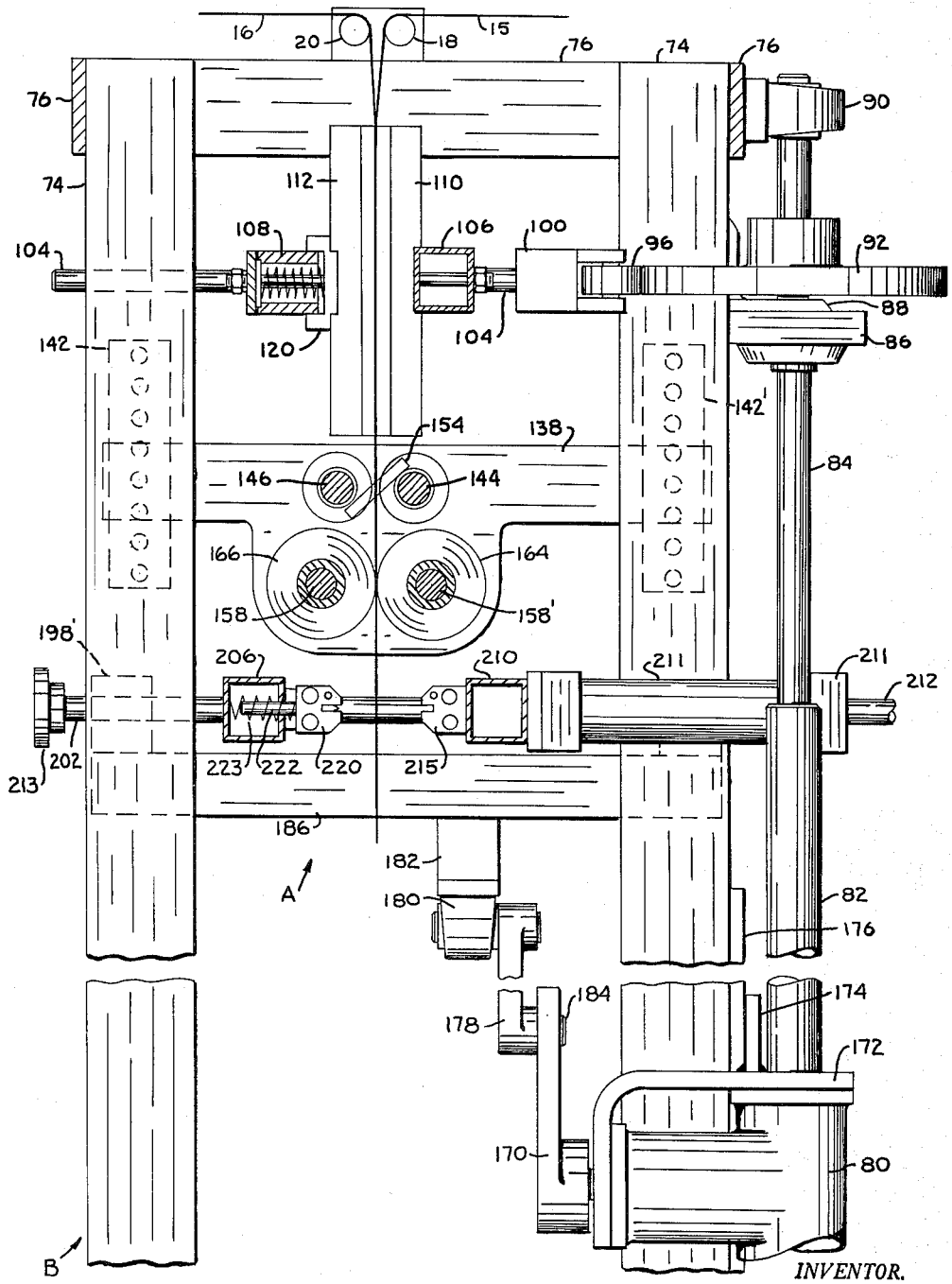
FIG. 3 is a view taken approximately in the plane of line 3—3 of FIG. 2.
Figure 10:
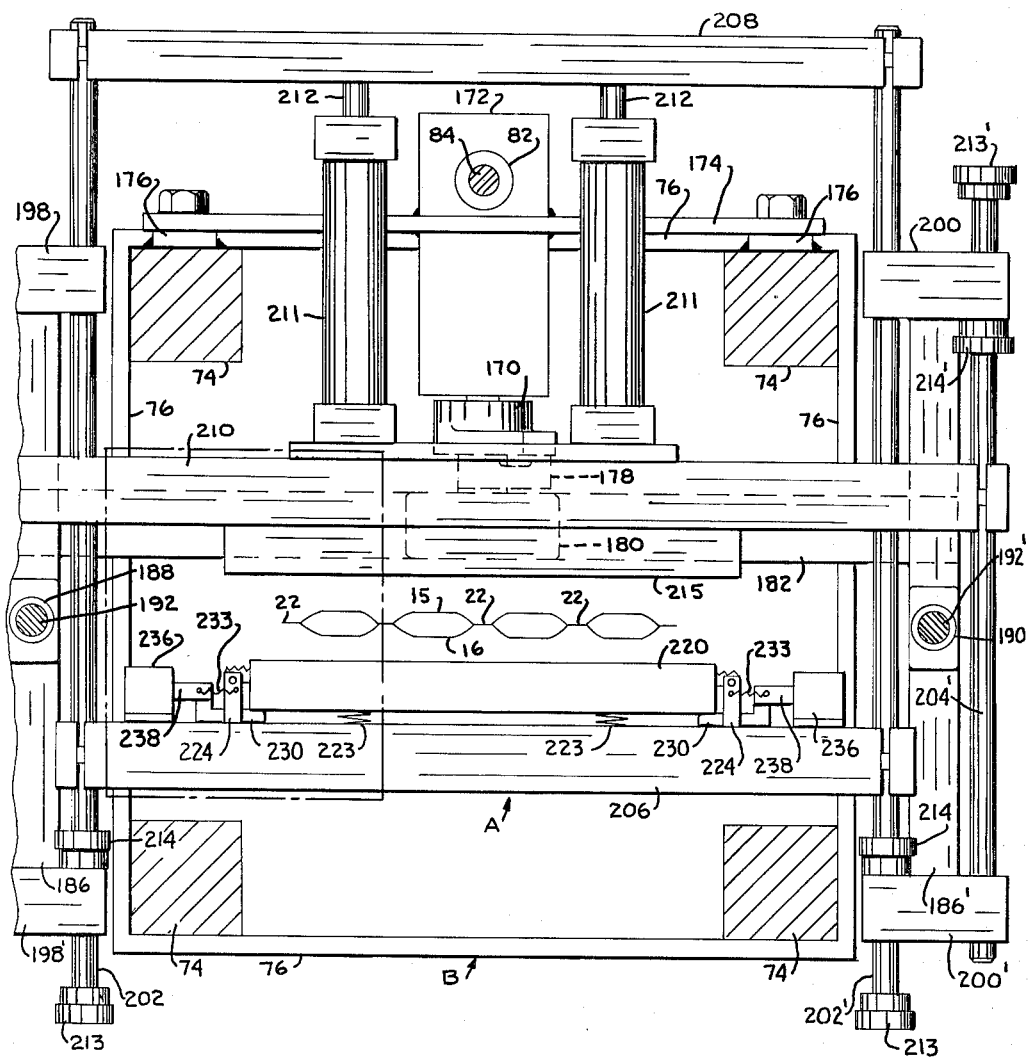
FIG. 10 is a view taken approximately in the plane of line 10—10 of FIG. 2.

As shown in FIGS. 2, 3 and 10, the reciprocable frame A is mounted for reciprocating movement in a vertical plane with respect to a stationary frame B mounted upon the machine's base 36. The stationary frame comprises four (4) upright spaced columns 74, one at each corner of a rectangle or square. The four columns are joined to one another by cross-straps 76 welded to the columns near their top and bottom ends (FIG. 2) to provide, with the base 36, a sturdy stationary frame.

As shown in FIG. 2, the shaft 44 is keyed into a surrounding tube 78 which is slideable thereon, the tube extending into a right angle drive gear box 80. A tube 82 extends upwardly from the gear box and is rotated at a desired speed, for example 1:1, the tube receiving and driving a shaft 84 through a suitable slideable keyed connection. As shown in FIG. 3, the upper end of the shaft 84 is journaled in a bearing 86 which is mounted on a support 88 secured to a stationary frame column 74. The shaft 84 further extends and has its end journaled in a pillow block 90 which is mounted on one of the top cross-straps 76 of the stationary frame.

Figure 4:
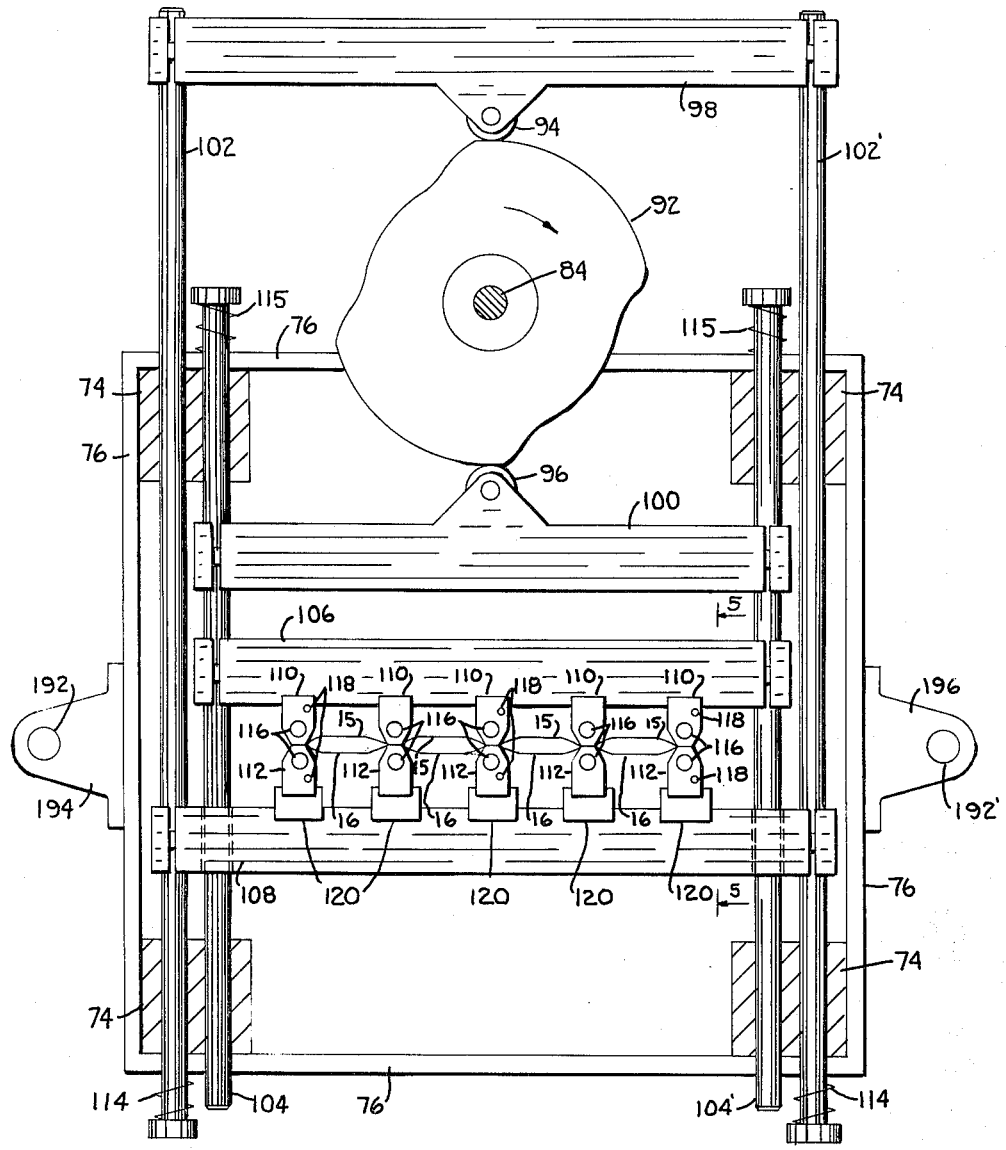
FIG. 4 is a view taken approximately in the plane of line 4—4 of FIG. 2.

As shown in FIGS. 3 and 4, a cam 92 is secured for rotation with the shaft 84. As shown in FIG. 4, the cam has just completed a high-dwell, causing the coacting cam followers 94 and 96, respectively associated with cross bars 98 and 100, to be spread apart to their fullest extent. The cross bar 98 is clamped or secured at its ends to a pair of laterally spaced reciprocably mounted rods 102, 102′. The cross bar 100 is clamped or secured to a pair of laterally spaced, reciprocably mounted rods 104, 104′. A side seal jaw carrier 106 is fastened at its ends to the spaced rods 104, 104′, and a second side seal jaw carrier 108 is fastened at its ends to the rods 102, 102′. The carrier 106 supports a plurality of laterally spaced sealing jaws 110; the carrier 108 supports a like number of sealing jaws 112 aligned for coaction with the jaws 110. Compression springs 114 and 115 are respectively associated with the rods 102, 102′ and 104, 104′ to normally urge the rods in directions which cause their respectively associated cam followers 94 and 96 to resiliently bear against the cam though the cam is in a low-dwell period. The springs 114 and 115 also act to normally urge the sealing jaws 110 and 112 toward their separated position. With the cam contour illustrated, its rotation 180° will result in one excursion of the side sealing jaws from their fully retracted position to the shown closed sealing position. The side sealing jaws 110 and 112 are each heated by cartridge heaters 116, and the temperature of each or alternate sealing jaws is probed by a thermistor device 118 to thereby enable the maintenance of accurate temperature by the aforementioned controller 64 (FIG. 2).

In accordance with the illustrated and preferred form of the invention, the side sealing jaws are arranged to readily and simply permit their number and spacing to be changed so that the number and width of packages produced during each cycle of the machine may be changed. Also, one bank of sealing jaws, for example the sealing jaws 112, are mounted on the carrier therefor in a manner to at all times assure that proper, predetermined, reliable sealing pressure is applied to the heat-sealable webs.

Figure 6:
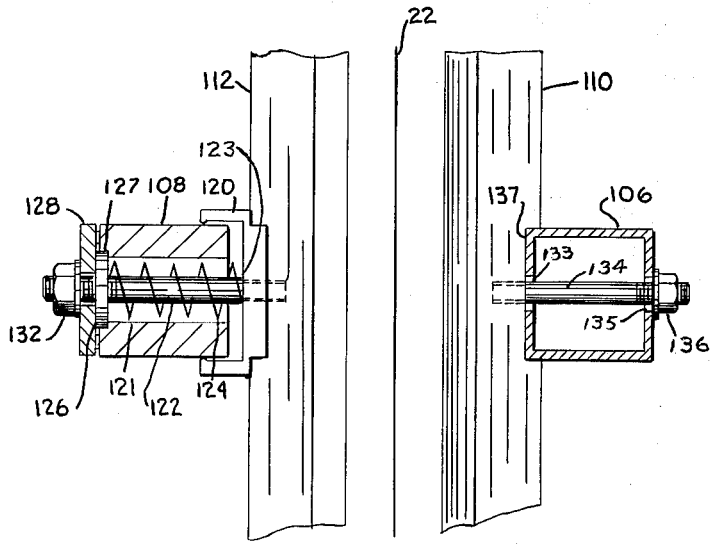
FIG. 6 is a view similar to FIG. 5 except that the sealing jaws are shown in their open position.
Figure 7:
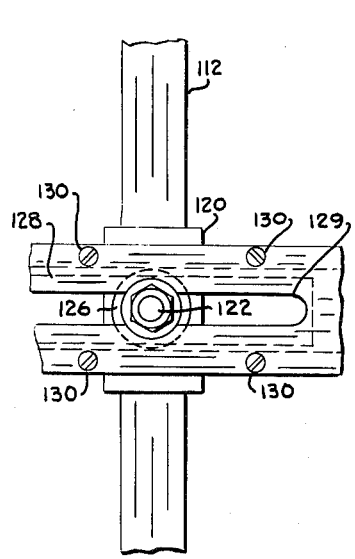
FIG. 7 is a side elevational view looking toward the right side of FIG. 5.
Figure 5:
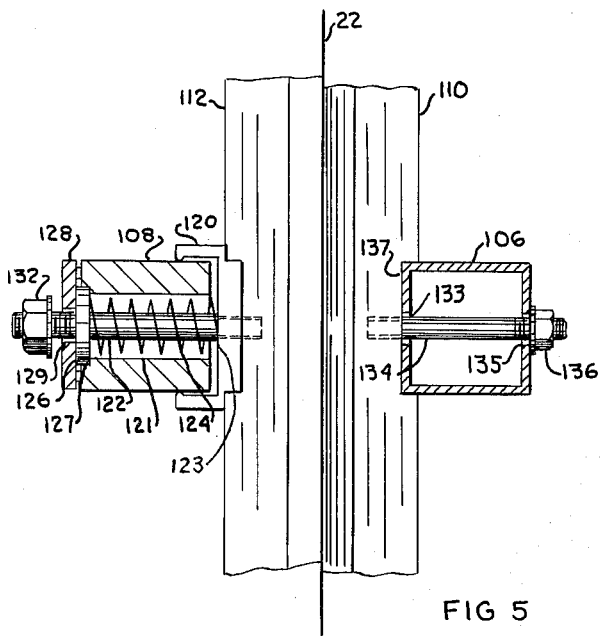
FIG. 5 is a view taken approximately in the plane of line 5—5 of FIG. 4.

As shown in FIGS. 5, 6 and 7 each of the jaw members 112 is adjustably connected to its carrier 108. For convenience, a separate intermediate U-shaped member 120 is provided for each sealing jaw. It will be understood however, that the rear face of each sealing jaw may be formed or machined to provide such configuration as an integral part of the jaw. Each of the members 120 is formed to closely straddle and provide a slide fit with respect to the carrier 108, the upper and lower surfaces of which are received within the member 120. The carrier 108 is provided with a central longitudinally extending slot 121 intermediate its ends through which a stud 122 is extended for each sealing jaw 112. The end of the stud is threaded and extends through an opening formed in the wall 123 of the member 120 and into an internally threaded opening formed in the rear face of the sealing jaw. The stud is surrounded by a compression spring 124 having one end thereof bearing against the wall 123 of the member 120. The opposite end of the stud, which also is threaded, extends through an opening in an annular washer 126, the washer being seated in a shallow longitudinally extending track 127 formed in the outer face of the carrier bar 108 adjacent the slot 121. A plate 128 having a longitudinally extending slot 129 is positioned to extend over the washers of the plurality of sealing jaw assemblies, the slotted plate being separably connected to the carrier bar 108 by spaced screws 130. A self locking nut 132 of any suitable type is threaded onto the exposed end of each stud 122.

Loosening the screws 130 permits the washers 126 to be unclamped from their pressure engagement with the carrier bar 108, thereby allowing the sealing jaw assemblies to be moved to any desired position along the carrier bar. Upon tightening up on the screws 130, the desired adjusted position of sealing jaws is maintained for a run of the machine. Such simple adjustment permits rapid set up of desired package widths as well as affording rapid addition or removal of sealing jaw assemblies. When the sealing jaws are separated or in open position as shown in FIG. 6, the nut 132 of each assembly bears against the plate 128, thereby limiting the rearward motion of the jaw 112.

When, as shown in FIG. 5, the jaws 110 and 112 are brought into sealing position, the resilient, floating action afforded by the springs 122 automatically affords uniform pressure engagement of the operating faces of the sealing jaws 110 and 112 with the heat-sealable webs. The resilient mounting of each of the jaws 112 assures that the entire operating face of each such jaw will always coact in full pressure engagement with the entire operating face of an opposite jaw 110. The springs 124 are selected for their capacity to provide the desired, proper sealing jaw pressure. Thus, regardless of the number of laterally spaced coacting pairs of sealing jaws 110 and 112, the jaws of each pair may engage the heat-sealable webs with the same desired pressure. Accurate and expensive machining of jaw faces to obtain alignment and uniform sealing pressure is obviated by the described arrangement of the invention.

As shown in FIGS. 5 and 6, each of the sealing jaws 110 is adjustably secured to their carrier bar 106 by a stud 134 secured to extend from the jaw and a lock nut 136 threaded on the exposed end of the stud. As shown, the carrier bar 106 is made of square, hollow tubing and is provided with opposite, aligned, longitudinally extending slots 133 and 135 to allow the studs to extend through the carrier bar. The rear face of each sealing jaw is recessed at 137 to receive a portion of the carrier bar 106 with a slight amount of clearance to thereby allow the jaw, if not secured to the bar, to slide along the bar. In this way, loosening up of the lock nuts will permit shifting or lateral adjustment of the sealing jaws 110 along the length of the carrier bar, and tightening of the lock nuts permits the jaws to be secured to the bar in desired adjusted position, opposite and paired with the jaws 112.

As shown in FIGS. 2 and 3, after the heat-sealable webs 15 and 16 leave the station where they are sealed to one another by the spaced pairs of side sealing jaws 110 and 112, they pass through a station where the webs are slit or perforated, as desired, within the areas where the webs (except at their extreme edges) have had the side seals imparted thereto. To accomplish these purposes, a pair of side plates 138 and 140 are secured to pads 142 and 142', the pads being respectively fastened to a pair of opposite columns 74 of the stationary frame B. The pads are provided with vertically spaced tapped holes to permit, by means of screws, up or down adjustment of the position of the side plates 138 and 140. The secured, adjusted position of the side plates will depend upon the desired length of the individual packages and the length of the side sealing jaws 110 and 112. The permitted adjustment of the side plates, and the cutting and/or perforating means which they support, enables the end seals to be imparted to the webs as high up as possible, thereby affording the advantage of an extremely short drop-off from a feeder to the end seals of the packages. When the packages are being filled with powders, a long drop-off will result in the settling of powder dust upon the faces of the webs at the areas to be sealed, and will furnish poor seals. Unduly long drops of heavy, solid items, such as pieces of hardware, will damage the webs and the seals.

Figure 8:
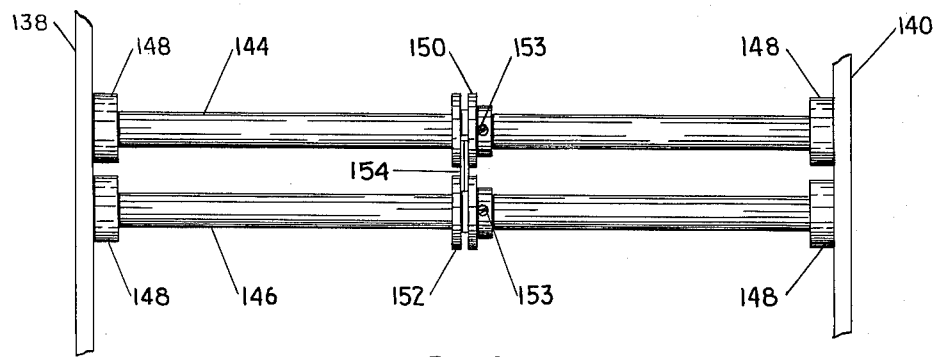
FIG. 8 is a view taken approximately in the plane of line 8—8 of FIG. 2.

As shown in FIGS. 2, 3 and 8, the side plates 138 and 140 serve to support a pair of spaced cross-rods 144 and 146, the ends of the rods being located in hollow bosses 148 provided on the inner faces of the side plates. A plurality of pairs of circumferential grooved collars 150 and 152 are slideably mounted on the rods 144 and 146, respectively. Although only one grooved collar is shown on each of the spaced rods in FIG. 8, it will be understood that the rods have a pair of coacting collars for each desired line of cutting. The slideable collars are located and fastened in desired position along their respective rods by set screws 153 extending through an annular side flange on each collar. A cutting element 154, preferably in the form of a razor blade of the injector type, is mounted to extend diagonally with respect to the collars 150 and 152 as shown in FIG. 3, the cutting element being positioned in the aligned grooves of the coacting pairs of collars. The ends of the cutting element are secured to the respective collars by set screws (not shown). As the webs are advanced through the machine in a manner to be soon described, the webs are cut in the side sealed areas 22. The rods 144 and 146 are readily removable to permit any desired number of pairs of slitting collars to be positioned thereon for adjustment to desired position and locking in place, or if it is desired to perforate the side sealed areas, the rods 144 and 146 and associated slitting arrangement may be removed entirely.

Figure 9:
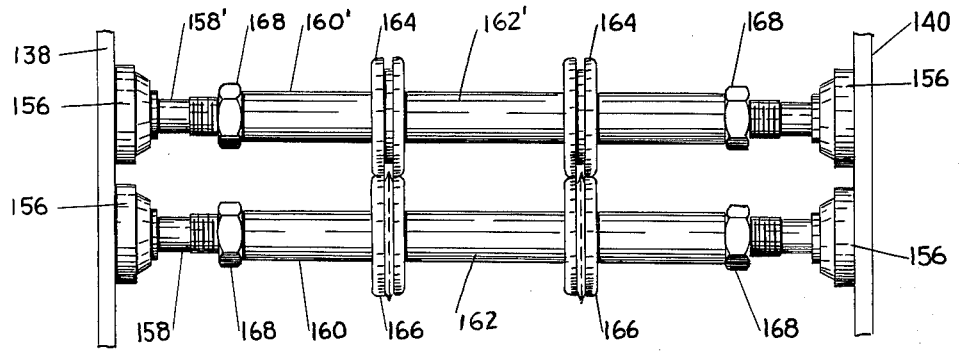
FIG. 9 is a view taken approximately in the plane of line 9—9 of FIG. 2.

As shown in FIGS. 2, 3 and 9, the means for perforating the sealed webs on the side sealed areas is also mounted upon the side plates 138 and 140, and may be located immediately below the described slitters. The side plates 138 and 140 also are provided with bearings of the ball bearing type 156 on their inner faces in which are supported a pair of laterally spaced rotatable shafts 158 and 158'. The shafts are externally threaded intermediate their ends and respectively receive thereon end spacer tubes 160 and 160' and intermediate spacer tubes 162 and 162'. The lengths of the tubes are selected for the desired spacing of the discs. The tubes serve to locate a plurality of pairs of circumferentially grooved discs 164 and 166. By tightening nuts 168 against the ends of the tubes, the discs are secured in desired adjusted position. One disc of each pair, for example the disc 166, is provided with perforating means, preferably in the form of V-shaped teeth so that the disc resembles a rotary saw. As the webs are pulled or fed through between an aligned pair of discs, the teeth perforate the webs in the side sealed areas.

As hereinbefore indicated, the mechanism for imparting the end seals 24 to the webs 15 and 16, together with the cut-off means and/or perforating means operable within the end seal areas, are mounted upon the reciprocable frame A for bodily movement therewith and for opening and closing movement of the end sealing means and the cut-off and/or perforating means. Referring to FIGS. 2, 3 and 10, it will be observed that the output of the right angle gear box 80 is to a crank 170. A gear ratio is selected so that the rotation of the crank is at half the speed of the shaft 84, which actuates the shown cam 92. A gear box is mounted on an angle bar 172 which is fastened, as by welding, to a cross bar 174. The cross bar is connected to a pair of intermediate pads 176 which are respectively fastened to the rear pair of spaced upstanding columns 74 of the stationary frame B. The pads are each provided wtih a series of vertically arranged, spaced tapped holes to allow adjustment of the cross bar 174 to a position which depends upon the length of the packages desired. The telescoping slide keyed connection between the shafts 44 and 84, through the intermediate tubes 78 and 82, allows such adjustment and driving relationship. Rotation of the crank 170 through a connecting rod 178, the end of which is connected to a pillow block 180, permits reciprocation of a second cross bar 182 to which the pillow block 180 is secured. As shown in FIG. 2, a pin 184 may be placed in any one of a series of openings 185 formed in the crank to compensate for the selected adjusted position of the cross bar 174, and to provide a length of travel for the cross bar 182 which is next longer than the package length desired. Precise control of package length is accomplished by the actuation of the end sealing jaws in their release of the webs at the end of the web feeding stroke, which the end sealing jaws also accomplish.

Still referring to FIGS. 2, 3 and 10, the cross bar 182 is secured, as by welding, to a pair of laterally spaced arms 186 and 186' to provide the frame A of substantially H-shape. The arms of the frame are located exteriorly of the outline provided by the columns 74 of the frame B. The arms 186 and 186' are guided for motion in a vertical plane by pairs of spaced guide bearings 188, 188' and 190, 190'. The guide bearings 188 and 188' are secured to the frame arm 186, and the bearings 190 and 190' are secured to the opposite arm 186'. The bearings 188 and 188' are slideably mounted on a rod 192 which extends between a pair of brackets 194 and 194' respectively supported by top and bottom cross straps 76 of the stationary frame. Similarly, the bearings 190 and 190' are slideably mounted on a rod 192' supported at its ends in brackets 196 and 196' fastened to the opposite ends of the top and bottom cross straps 76.

As shown in FIG. 10, a pair of spaced bushing blocks 198, 198' are secured to opposite ends of the arm 186 of the reciprocably mounted frame A, and similarly, a pair of bushing blocks 200, 200' are secured to the ends of the opposite arm 186'. A pair of spaced guide rods 202 and 204 (FIG. 2) are slideably journaled in the bushing blocks 198, 198', and on the other side of the frame and similarly, spaced guide rods 202' and 204' are journaled in the bushing blocks 200 and 200'.

As best seen in FIG. 10, a front end seal carrier bar 206 is secured at its ends to the spaced guide rods 202 and 202', these same rods having a back bar 208 also secured thereto in spaced relation to the bar 206. A rear end seal carrier bar 210 is fastened at its ends to the guide rods 204 and 204'. A pair of spaced air or hydraulic cylinders 211 are mounted on the rear face of the bar 210 and their piston rods 212 are connected to the bar 208. When the cylinders are actuated, as by means of solenoid valves timed by the micro-switches and cams rotated on the shaft 50 (FIG. 2), the piston rods 212 move to their outward position and cause closing movement of the carriers 206 and 210 for the end sealing jaws. The application of air or fluid pressure to the other ends of the cylinders 211 cause retraction of the bar 210 and their movement apart to separated position. Resilient, bumper-like stops 213 located on the ends of the slideable rods 202 and 202', and stops 213' on the ends of the rods 204 and 204' serve to locate the end seal carriers 206 and 210 in their proper closed position. Also, the rods 202, 202' and 204, 204' are respectively provided with bumper stops 214 and 214' to properly locate the end seal carriers 206 and 210 in their separated or open position. Thus, the assembly for the end sealing mechanism comprises a frame A mounted for reciprocable motion in one plane, vertically as viewed in FIG. 2, with the carrier 210 adapted to support an end sealing jaw, mounted for reciprocating motion in a plane transversely to the plane of motion for the entire assembly.

Figure 11:
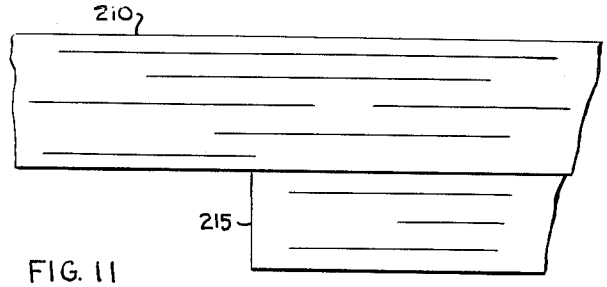
FIG. 11 is an enlarged and detailed view of that portion of FIG. 10 which is delineated within the area circumscribed by the area with in the dot-dash lines.
Figure 12:
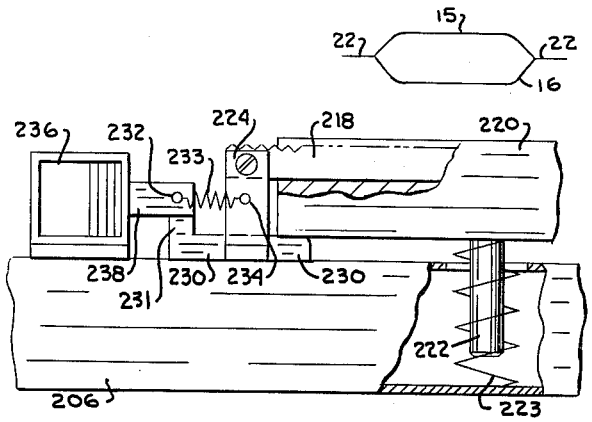
FIG. 12 is a view similar to FIG. 11, except that the sealing jaws and the cutting means are shown in their closed position.
Figure 12:
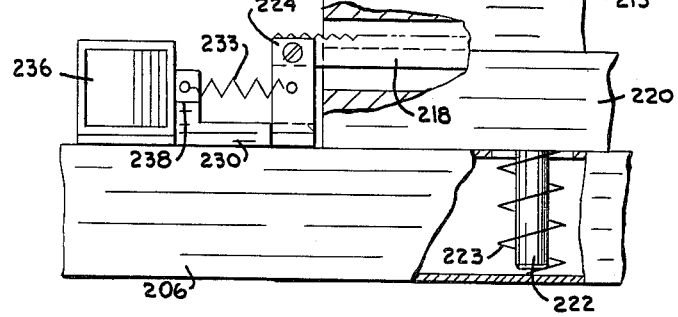
Figure 13:
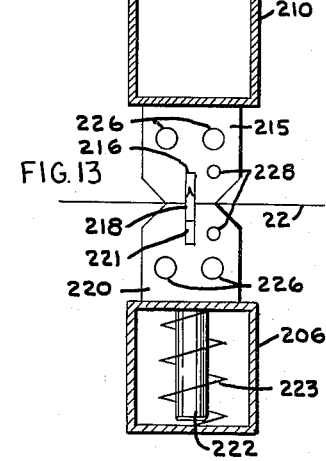
FIG. 13 is a side elevational view looking toward the left side of FIG. 12.

In greater detail, FIGS. 11, 12 and 13 illustrate a preferred form of the structure for the end sealing jaws and their associated perforating and/or cutting means. The rear carrier 210 has secured thereto in any desired manner a sealing jaw 215, the operating face of which is provided with a longitudinally extending groove 216 which is adapted to receive a cut-off knife 218. Instead of a cut-off knife, a perforating element may be substituted therefor, or the element may take the form of cutting means for a portion of its length and perforating means for the remainder of its length. The front end sealing jaw 220 is resiliently mounted to furnish a slip fit with respect to the cutting and/or perforating element 218, and for this purpose such element is positioned in a groove 221 formed in the operating face of the sealing jaw 220. The sealing jaw 220 is provided with a pair of studs 222, one being shown, about which is positioned compression spring 223. The studs extend into the carrier 206, which is formed of hollow square tubing to allow the studs to extend therein and to receive the compression spring surrounding the stud. The cutting and/or perforating element is secured at its ends to brackets 224 which are fixedly secured to the carrier bar 206. The sealing jaws 215 and 220 are heated by cartridge heaters 226, and the temperature is controlled by thermistor probes 228 connected to the control unit 64 (FIG. 2).

As shown in FIG. 10, and more particularly in FIGS. 11 and 12, a back up slide 230 is arranged for positioning intermediate the sealing jaw 220 and its carrier 206 at each end of the jaw. Both slides are shown in FIG. 10. The slides are L-shaped with the upstanding arm 231 thereof provided wtih a pin 232. A tension spring 233 has one end thereof connected to the pin of the slide and its other end anchored to a pin 234, which is fastened to the cutting element supporting bracket 224. A solenoid 236 is mounted on the carrier 206, and the solenoid plunger 238 has a slot through its end which receives the arm 231 of the slide 230.

When, as shown in FIG. 11, the back-up slides 230, there is one on each side of the jaw, are located between the jaw and its carrier, the jaws 215 and 220 upon closing, will effect end sealing, but will not allow the cutting knife 218 to operate upon the webs. This action obtains because the slides do not allow the jaw 220 to move back against its resilient mounting, and the knife edge is located below the operating face of the sealing jaw. When it is desired to both seal and cut within the sealing area, the solenoids 236 are actuated to retract the slides 230 whereupon, on closing the jaws 215 and 220, as shown in FIG. 12, the resiliently mounted jaw 220 may move rearwardly up against the carrier 206 to expose the knife edge at the operating face of the jaw with which the knife is related by the described slide fit, and thereby both seal and cut the webs.

When it is desired to perforate within the end seal areas, an element formed to perforate is simply substituted for the cutting knife in the described arrangement. The described back slide and solenoid arrangement affords selective combinations of cutting and sealing or perforating, or both, or sealing alone, without necessitating down-time of the machine for the desired setup. The solenoids are simply actuated or not. Also, a perforating element may be used either to perforate or fully cut through the sealed areas. To perforate, the slide may be provided with a step at the portion thereof which extends between the jaw and the carrier so that only a portion of the perforating element is exposed when the jaws 215 and 220 are in engagement. Fully withdrawing the slides from between the jaw 220 and its carrier 206 will allow the perforating element to move entirely through the webs and thereby act to cut through them completely.

In order to obviate the use of an alternative expression in the claims, the term "cutting means" is intended to include perforating means, or means which acts to both cut and/or perforate.

It is believed that the advantages of the machine of the invention will be apparent from the foregoing detailed description of a preferred embodiment thereof. The machine is capable of forming a plurality of filled packages at each cycle at extremely high rates of productivity and with extremely reliable seals. Separate unit packages, or groups of separably connected unit packages of desired size may be obtained by very simple adjustments of the machine. Machine adjustments to furnish different packages, sizes and different numbers of groups of separably connected unit packages are simple and rapidly accomplished, thereby affording minimum down-time of the machine. The manner in which the side sealing jaws are mounted affords seals sufficiently reliable so that the packages may contain a liquid, and uniform sealing pressure is obtained simply and inexpensively; also, the end sealing jaws are mounted in a manner to provide extremely reliable seals. Further, the machine affords the advantage of an extremely short drop-off from a contents feeder to the end seals of the formed packages to thereby minimize damage to the webs and the end seals. It will be understood that the described machine represents a preferred embodiment thereof; various modifications and changes may be made without departing from the spirit and scope of the invention as sought to be defined in the following claims.

I claim:

1. A machine for forming flexible packages comprising a stationary frame, a pair of carrier bars supported on the stationary frame mounted for movement toward and away from one another, a plurality of side sealing jaws mounted on each of said carrier bars to permit their secured adjustment in aligned, spaced pairs along the carrier bars to provide side seals for a plurality of packages simultaneously, the sealing jaws on one of the carrier bars being resiliently mounted to furnish uniform pressure coaction with the sealing jaws on the other bar, means for leading a pair of heat-sealable webs into juxtaposition between said jaws, said webs being of a width sufficient to furnish a plurality of packages widthwise of the webs, a second frame mounted on said stationary frame for reciprocable movement toward and away from said side sealing jaws, end sealing means supported by said second frame adapted to both seal the webs to one another in an area extending transversely of the seals imparted by said side sealing jaws and to advance the webs, and drive means for actuating said side sealing jaws, said second frame and said end sealing means in timed relation to close the end sealing means and to move the second frame away from the side sealing jaws when the side sealing jaws are in their open position.

2. A machine for forming flexible packages comprising a stationary frame, a plurality of laterally spaced pairs of side sealing jaws supported on said frame for opening and closing movement, means for leading a pair of heat-sealable webs into juxtaposition between said jaws, a second frame mounted on said stationary frame for reciprocable movement toward and away from said side sealing jaws, end sealing means supported by said second frame adapted to both seal the webs to one another in an area extending transversely of the seals imparted by said side sealing jaws and to advance the webs, said end sealing means having cutting means associated therewith to contemporaneously cut the webs within the areas sealed by the end sealing means, and drive means for actuating said side sealing jaws, said second frame and said end sealing means in timed relation to close the end sealing means and to move the second frame away from the side sealing jaws when the side sealing jaws are in their open position.

3. A machine for forming flexible packages as set forth in claim 2, wherein the end sealing means comprises a pair of jaws each having a longitudinally extending groove formed in the operating face thereof, one of said jaws being resiliently supported on a carrier member, cutting means fixedly supported upon the carrier member and positioned in the groove of said resiliently mounted jaw with a slip fit and adapted to have its cutting edge received in the groove in the other jaw.

4. A machine for forming flexible packages as set forth in claim 2, wherein the end sealing means comprises a pair of jaws each having a longitudinally extending groove formed in the operating face thereof, one of said jaws being resiliently supported on a carrier member, cutting means fixedly supported upon the carrier member and positioned in the groove of said resiliently mounted jaw with a slip fit and adapted to have its cutting edge received in the groove in the other jaw, a slide member; and means for selectively interposing the slide member between the resiliently mounted jaw and said carrier member.

5. A machine for forming flexible packages as set forth in claim 1, wherein the second frame is adjustably mounted with respect to the stationary frame to permit changing the length of stroke of the second frame; and wherein the drive means for actuating the second frame is adjustable to accommodate a change in stroke of the second frame.

6. A machine for forming flexible packages comprising a stationary frame, a pair of carrier bars mounted on the frame for movement toward and away from one another, a plurality of side sealing jaws mounted on the carrier bars to permit their secured adjustment in aligned, spaced pairs, the sealing jaws on one of the bars being resiliently mounted to furnish uniform pressure coaction with the sealing jaws on the other bar, means for leading a pair of heat-sealable webs into juxtaposition between the jaws, a second frame mounted on said stationary frame for reciprocable movement toward and away from said side sealing jaws, said second frame being adjustably mounted with respect to the stationary frame to permit changing the length of stroke of the second frame, a pair of end sealing jaws supported by said second frame, at least one of the end sealing jaws being mounted on the second frame for movement in a plane transversely of the plane of movement of the second frame and toward and away from the other end sealing jaw, said end sealing jaws acting to both seal the webs to one another in an area extending transversely of the seals imparted by said side sealing jaws and to advance the webs, a longitudinally extending groove formed in the operating face of each end sealing jaw, one of said end sealing jaws being resiliently supported on a carrier member, cutting means fixedly supported upon the carrier member and positioned in the groove of said resiliently mounted jaw with a slip fit and adapted to have its cutting edge received in the groove in the other jaw, drive means for actuating said side sealing jaws, said second frame and said end sealing jaws in timed relation to close the end sealing jaws and to move the second frame away from the side sealing jaws when the side sealing jaws are in their open position, said drive means being adjustable to accommodate the adjusted stroke of the second frame.

7. A machine for forming flexible packages as set forth in claim 6, wherein means for cutting the webs in the areas sealed by the side sealing jaws are supported on the stationary frame intermediate the side sealing jaws and the second frame.

8. A machine for forming flexible packages as set forth in claim 6, wherein means for cutting the webs in the areas sealed by the side sealing jaws are supported on the stationary frame intermediate the side sealing jaws and the second frame; and wherein said means comprises a plurality of cutting means mounted for secured adjustment in spaced relation transversely of the direction of feeding of the heat-sealable webs.

9. A machine for forming flexible packages as set forth in claim 6, wherein a slide member is provided for selective interposition between the resiliently mounted end sealing jaw and its carrier member.

10. A machine for forming flexible packages comprising a stationary frame, a plurality of laterally spaced pairs of side sealing jaws supported on said frame for opening and closing movement, means for leading a pair of heat-sealable webs into juxtaposition between said jaws, a second frame mounted on said stationary frame for reciprocable movement toward and away from said side sealing jaws, end sealing means supported by said second frame adapted to both seal the webs to one another in an area extending transversely of the seals imparted by said side sealing jaws and to advance the webs, drive means for actuating said side sealing jaws, said second frame and said end sealing means in timed relation to close the end sealing means and to move the second frame away from the side sealing jaws when the side sealing jaws are in their open position, and means for cutting the webs in the area sealed by the side sealing jaws supported on the stationary frame intermediate the side sealing jaws and said second frame.

11. A machine for forming flexible packages as set forth in claim 10, wherein the means for cutting the webs in the areas sealed by the side sealing jaws comprises a plurality of cutting means mounted for secured adjustment in spaced relation transversely of the direction of feeding of the heat-sealable webs.

References Cited by the Examiner
UNITED STATES PATENTS

| | | | |
|---|---|---|---|
| 2,103,390 | 12/37 | Salfisberg | 53—182 X |
| 2,747,346 | 5/56 | Tegerman et al. | 53—182 X |
| 2,869,298 | 1/59 | Zwoyer | 53—182 X |
| 2,917,879 | 12/59 | Aubin | 53—180 X |
| 2,950,588 | 8/60 | Gausman | 53—28 X |

TRAVIS S. McGEHEE, *Primary Examiner.*

FRANK E. BAILEY, *Examiner.*